United States Patent
Han et al.

(10) Patent No.: US 9,831,685 B2
(45) Date of Patent: Nov. 28, 2017

(54) WIRELESS POWER TRANSMITTER

(71) Applicant: SAMSUNG ELECTRO-MECHANICS CO., LTD., Suwon-si (KR)

(72) Inventors: Chang Mok Han, Suwon-si (KR); Ki Won Chang, Suwon-si (KR); Isaac Nam, Suwon-si (KR); Sung Heum Park, Suwon-si (KR); Chul Gyun Park, Suwon-si (KR); Jae Suk Sung, Suwon-si (KR); Hyun Keun Lim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 305 days.

(21) Appl. No.: 14/707,724

(22) Filed: May 8, 2015

(65) Prior Publication Data

US 2015/0333532 A1    Nov. 19, 2015

(30) Foreign Application Priority Data

May 16, 2014  (KR) .................. 10-2014-0059266
Nov. 11, 2014  (KR) .................. 10-2014-0155887

(51) Int. Cl.
*H02J 7/00*    (2006.01)
*H02J 5/00*    (2016.01)
(Continued)

(52) U.S. Cl.
CPC ............ *H02J 5/005* (2013.01); *H01F 27/365* (2013.01); *H01F 38/14* (2013.01); *H02J 7/025* (2013.01);
(Continued)

(58) Field of Classification Search
CPC ........ H01F 38/14; H02J 7/025; H04B 5/0037; H04B 5/0081
See application file for complete search history.

(56) References Cited

U.S. PATENT DOCUMENTS 8,207,807 B2 *  6/2012  Kikuchi .............. H01F 27/2871
                                                336/188
8,482,161 B2 *  7/2013  Amano .................. B60L 11/182
                                                307/104
(Continued)

FOREIGN PATENT DOCUMENTS

JP    2013-62987 A    4/2013
JP    5286445 B1    9/2013
(Continued)

OTHER PUBLICATIONS

Chinese Office Action dated Dec. 5, 2016 in Chinese Patent Application No. 201510254260.6 (22 pages, with English translation).
(Continued)

*Primary Examiner* — Jeffrey Zweizig
(74) *Attorney, Agent, or Firm* — NSIP Law

(57) ABSTRACT

A wireless power transmitter according to an exemplary embodiment in the present disclosure may include a transmitting core; a transmitting coil provided on the transmitting core and transmitting power wirelessly; and a magnetic body provided on the transmitting core and allowing a virtual line which is normal to a surface of the magnetic body to form an acute angle with the transmitting core.

17 Claims, 8 Drawing Sheets

(51) Int. Cl.
*H01F 38/14* (2006.01)
*H02J 7/02* (2016.01)
*H04B 5/00* (2006.01)
*H01F 27/36* (2006.01)

(52) U.S. Cl.
CPC ......... *H04B 5/0037* (2013.01); *H04B 5/0081* (2013.01)

(56) References Cited

U.S. PATENT DOCUMENTS

| | | | | |
|---|---|---|---|---|
| 9,362,776 | B2* | 6/2016 | Low | G04C 10/00 |
| 9,438,067 | B2* | 9/2016 | Na | H02J 7/025 |
| 2002/0041176 | A1* | 4/2002 | Eki | H02J 7/025 |
| | | | | 320/109 |
| 2012/0286584 | A1* | 11/2012 | Park | H01F 38/14 |
| | | | | 307/104 |
| 2013/0181668 | A1* | 7/2013 | Tabata | H01F 38/14 |
| | | | | 320/108 |
| 2013/0328407 | A1* | 12/2013 | Shimura | H02J 7/025 |
| | | | | 307/104 |
| 2014/0167524 | A1* | 6/2014 | Oodachi | H01F 27/346 |
| | | | | 307/104 |
| 2014/0183966 | A1 | 7/2014 | Suzuki et al. | |
| 2015/0028685 | A1* | 1/2015 | Choi | H01F 38/14 |
| | | | | 307/104 |
| 2015/0263528 | A1* | 9/2015 | Kitamura | H01F 27/2804 |
| | | | | 307/104 |

FOREIGN PATENT DOCUMENTS

| | | |
|---|---|---|
| KR | 10-2011-0049659 A | 5/2011 |
| KR | 10-2012-0117262 A | 10/2012 |
| TW | 201347349 A | 11/2013 |
| WO | WO 2013/038782 A2 | 3/2013 |
| WO | WO 2013/038783 A2 | 3/2013 |
| WO | WO 2013/142720 A1 | 9/2013 |

OTHER PUBLICATIONS

Korean Office Action dated Oct. 20, 2016 in counterpart Korean Patent Application No. 10-2014-0155887 (11 pages, with English translation).

Extended European Search Report dated Oct. 12, 2015 in counterpart European Application No. 15167525.3 (8 pages, in English).

* cited by examiner

WIRELESS POWER TRANSMITTER

CROSS-REFERENCE TO RELATED APPLICATIONS

This application claims priority to, and the benefit of, Korean Patent Application Nos. 10-2014-0059266 filed on May 16, 2014 and 10-2014-0155887 filed on Nov. 11, 2014, with the Korean Intellectual Property Office, the disclosures of which are incorporated herein by reference.

BACKGROUND

This application relates to a wireless power transmitter.

In accordance with the development of wireless technology, various applications of the wireless technology range from the transmission of data to the transmission of power. Recently, a type of wireless power transmission technology allowing for the transmission of power to various portable devices in a non-contact manner has come to prominence.

However, in a wireless power transmission technology according to the related art, there are difficulties in smoothly performing a charging. That is, there are difficulties in wirelessly transmitting and receiving power, such as a limited transmission distance, a restrictive positional relationship between a transmitter and a receiver, and the like. Therefore, wireless power transmissions and receptions may only be enabled if a wireless power receiver is positioned in a specific location or in a specific direction with respect to a wireless power transmitter.

Meanwhile, a wireless power transmission and reception technology has been applied to various portable devices. Therefore, a demand has increased for the wireless power transmission technology with an enhanced charging efficiency in many different environments.

RELATED ART DOCUMENT

Patent Document 1 Japanese Patent Laid-Open Publication No. 2013-062987

SUMMARY

An exemplary embodiment in the present disclosure may provide a wireless power transmitter capable of efficiently transmitting power wirelessly to various portable devices.

According to an exemplary embodiment in the present disclosure, a wireless power transmitter may includes: a transmitting core; a transmitting coil provided on the transmitting core and transmitting power wirelessly; and a magnetic body provided on the transmitting core and allowing a virtual line which is normal to a surface of the magnetic body to form an acute angle with the transmitting core.

According to another exemplary embodiment in the present disclosure, a wireless power transmitter may include: a transmitting coil transmitting power wirelessly; and a magnetic body disposed in a central portion of the transmitting coil and allowing a virtual line which is normal to a surface of the magnetic body to form an acute angle with the transmitting coil.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Exemplary embodiments in the present disclosure will now be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

Figure 1:
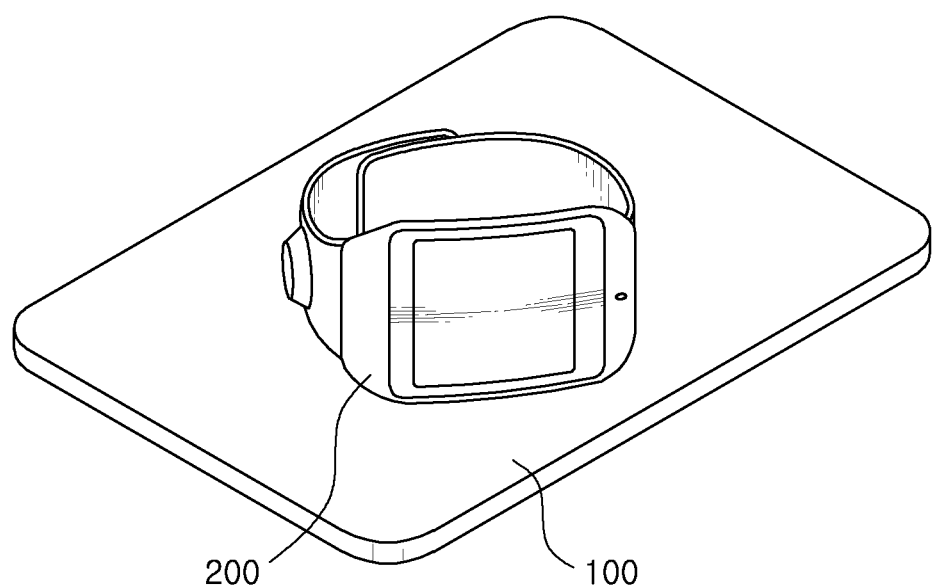
FIG. 1 is a diagram illustrating an example of an application to which a wireless power transmitter according to an exemplary embodiment in the present disclosure is applied.

FIG. 1 is a diagram illustrating an example of an application to which a wireless power transmitter according to an exemplary embodiment in the present disclosure is applied. In FIG. 1, reference numeral 100 indicates a wireless power transmitter and reference numeral 200 indicates a wireless power receiver.

The wireless power transmitter 100 may wirelessly transmit power using a voltage input from an external power source. The wireless power transmitter 100 may include a transmitting coil for transmitting power wirelessly.

The wireless power receiver 200 may wirelessly receive the power provided from the wireless power transmitter 100. The wireless power receiver 200 may include a receiving coil for receiving power wirelessly. The wireless power receiver 200 may be mounted in various electronic devices or may be implemented integrally with the electronic devices. Although a case in which the electronic device is a wearable device of a clock shape is illustrated in FIG. 1, the electronic device may have various shapes such as glasses, and the like.

The receiving coil of the wireless power receiver 200 may be positioned at various angles with respect to the transmitting coil of the wireless power transmitter 100. According to the related art, charging is smoothly performed only in a state in which the transmitting coil of the wireless power transmitter 100 and the receiving coil of the wireless power receiver 200 are parallel to each other. However, according to an exemplary embodiment in the present disclosure, the power may be smoothly transmitted and received wirelessly even in a case in which the receiving coil of the wireless power receiver 200 and the transmitting coil of the wireless power transmitter 100 are not parallel to each other, for example, in a case in which the receiving coil of the wireless power receiver 200 and the transmitting coil of the wireless power transmitter 100 maintain an angle of 90° as in the illustrated example.

Hereinafter, a case in which the receiving coil of the wireless power receiver 200 and the transmitting coil of the wireless power transmitter 100 are disposed to be perpendicular to each other will be described by way of example, but according to exemplary embodiments described below, the power may be wirelessly transmitted and received even at various angles at which the receiving coil of the wireless power receiver 200 and the transmitting coil of the wireless power transmitter 100 are not perpendicular to each other.

Figure 2C:
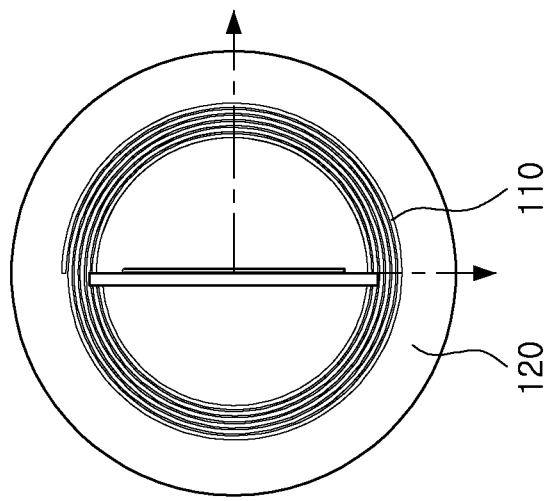
FIGS. 2A through 2C are a perspective view, a side view, and a plan view of a transmitting coil of a wireless power transmitter and a receiving coil of a wireless power receiver which are disposed to be perpendicular to each other.
Figure 2B:
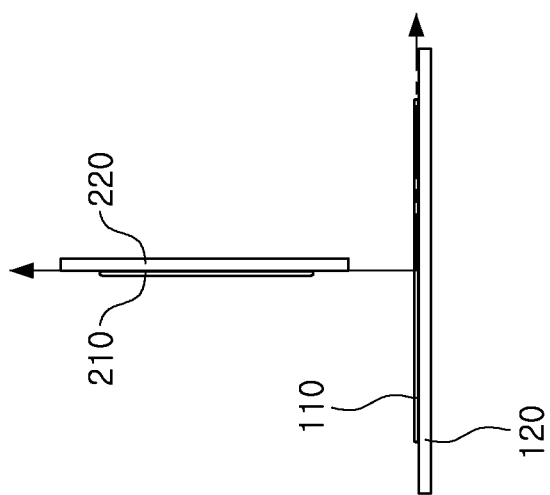
Figure 2A:
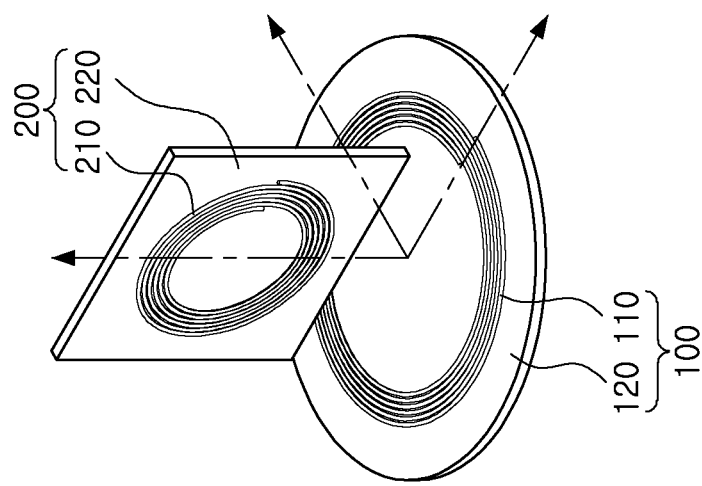

FIGS. 2A through 2C are a perspective view, a side view, and a plan view of the transmitting coil of the wireless power transmitter 100 and the receiving coil of the wireless power receiver 200 which are disposed to be perpendicular to each other.

Figure 3:
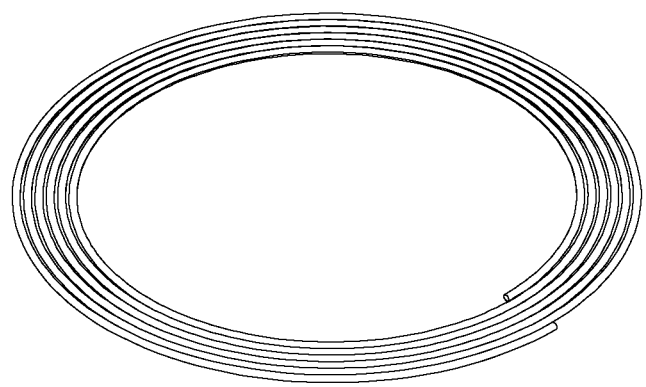
FIG. 3 is a diagram illustrating an example of a coil used in the wireless power transmitter or the wireless power receiver.
Figure 4:
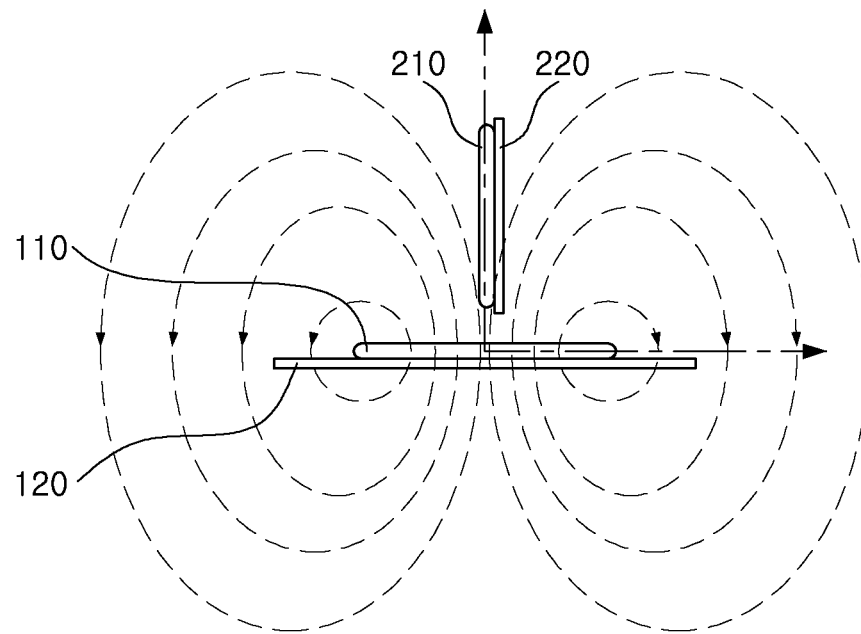
FIGS. 4 and 5 are diagrams illustrating a magnetic coupling depending on positions of the wireless power receiver and the wireless power transmitter.
Figure 6:
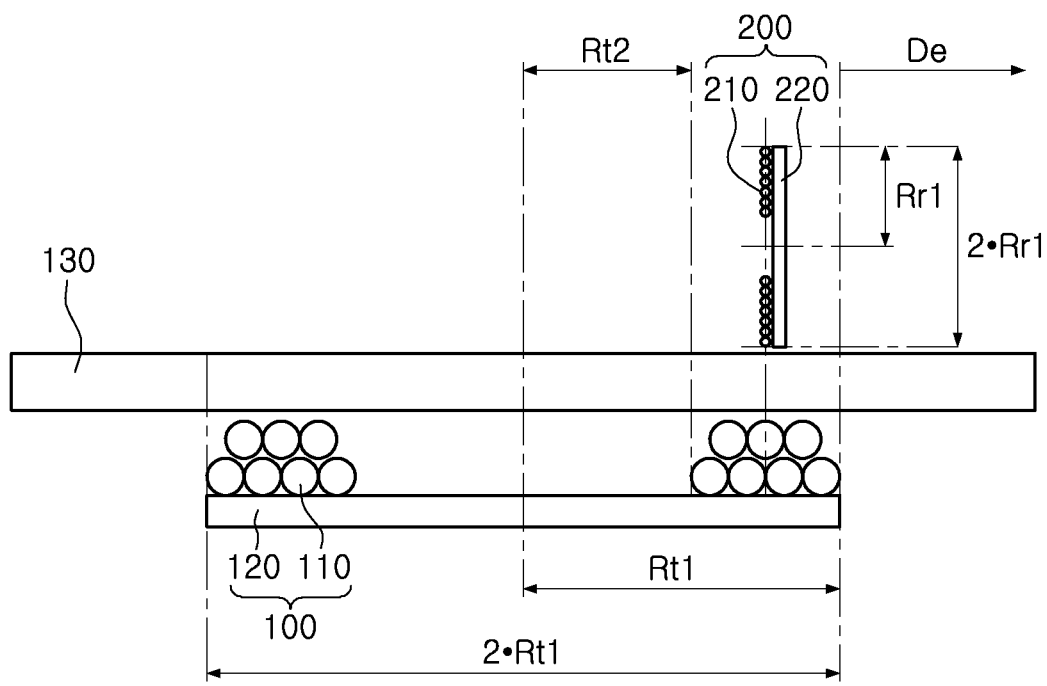
FIGS. 6 through 8 are diagrams illustrating the configuration of a wireless power transmitter according to an exemplary embodiment in the present disclosure.

The wireless power transmitter 100 may include a transmitting coil 110 and a transmitting core 120. Although the transmitting coil 110 is illustrated as one loop in FIG. 2, the transmitting coil 110 may be provided to be wound several times as illustrated in FIG. 3. Alternatively, the transmitting coil 110 may also be provided so as to be wound in a plurality of layers as illustrated in FIG. 6.

The transmitting core 120 may include a substrate or a magnetic transmitting core. The magnetic transmitting core may be formed of a material having a predetermined magnetism. For example, the magnetic transmitting core may be formed of a resin material including metal powders. As another example, the magnetic transmitting core may be formed of a ferrite sheet (which may include NiZnCu/MnZn based metal), a sendust based metal, a permalloy based metal, an amorphous based magnetic body, or a combination thereof.

The wireless power receiver 200 may also include a receiving coil 210 and a receiving core 220. In addition, as described above, the wireless power receiver 200 may also include the receiving coil 210 having various shapes and the receiving core 220 formed of various materials.

FIGS. 2A-2C and 4 illustrate examples in which the wireless power receiver 200 is disposed in the center of the wireless power transmitter 100.

A shown dotted line indicates a magnetic field transmitted from the wireless power transmitter 100, and in the case in which the wireless power receiver 200 is disposed as shown in FIGS. 2A-2C and 4, the transmitted magnetic field may be parallel to the wireless power receiver 200 or may have a slight gradient with respect to the wireless power receiver 200. Therefore, the transmitted magnetic field may be hardly magnetically coupled or be very weakly coupled to the receiving coil 210 of the wireless power receiver 200.

Figure 5:
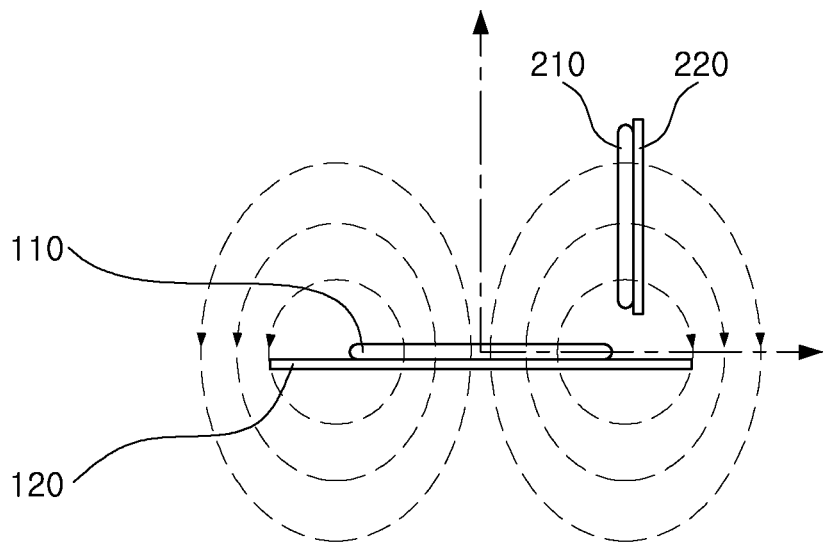

FIG. 5 illustrates an example in which the wireless power receiver 200 is disposed on the transmitting coil of the wireless power transmitter 100.

As shown, since the magnetic field transmitted from the wireless power transmitter 100 forms a kind of loop, the magnetic field may pass through the receiving coil 210 of the wireless power receiver 200. Therefore, the transmitting coil 110 of the wireless power transmitter 100 and the receiving coil 210 of the wireless power receiver 200 may be magnetically coupled to each other.

However, even in the case of the example illustrated in FIG. 5, since strength and efficiency of the magnetic coupling are merely in a low state, it is difficult to achieve efficient wireless charging in the case of the example illustrated in FIG. 5.

Therefore, hereinafter, various exemplary embodiments in the present disclosure will be described with reference to FIGS. 6 through 13.

FIG. 6 is a cross-sectional view of the wireless power transmitter according to an exemplary embodiment in the present disclosure.

As shown in FIG. 6, the transmitting coil 110 of the wireless power transmitter 100 may include a plurality of layers. In the case in which the transmitting coil 110 includes the plurality of layers, flux of the magnetic field transmitted from the transmitting coil 110 may become stronger and vertical directivity of the magnetic field may become stronger.

Therefore, since the magnetic field transmitted from the wireless power transmitter 100 becomes stronger, the magnetic coupling in the receiving coil 210 of the wireless power receiver 200 may be more efficiently performed.

In this case, the wireless power transmitter 100 may wirelessly transmit the power in an electromagnetic resonance mode through the transmitting coil 110. In this case, the transmitting coil 110 may have a value of about 10 μH or less at a frequency of 6.78 MHz. In addition, the transmitting coil 110 may be implemented in a spiral shape or a helical shape, and in the case in which the transmitting coil 110 is implemented in the spiral shape, a size of an internal diameter of the transmitting coil 110 may be larger than 20 mm. In a case in which the size of the internal diameter of the transmitting coil 110 is increased, a degree of freedom of an arrangement of the wireless power receiver 200 may be improved. Alternatively, a size of an external diameter of the transmitting coil 110 may be larger than 45 mm.

As illustrated in FIG. 6, in the wireless power transmitter according to an exemplary embodiment in the present disclosure, a length of the transmitting core 120 may be equal to the diameter of the transmitting coil 110. The transmitting core 120 may be the magnetic transmitting core as described above, and the magnetic transmitting core may attract the magnetic field transmitted from the transmitting coil 110 to provide a stronger magnetic circulation effect.

Meanwhile, in a case in which the transmitting core 120 is extended to be longer than the transmitting coil 110, the transmitting core 120 may more strongly induce the magnetic field transmitted from the transmitting coil 110 and forming a predetermined loop, magnetic coupling property in the receiving coil 210 may be more improved.

Figure 7:
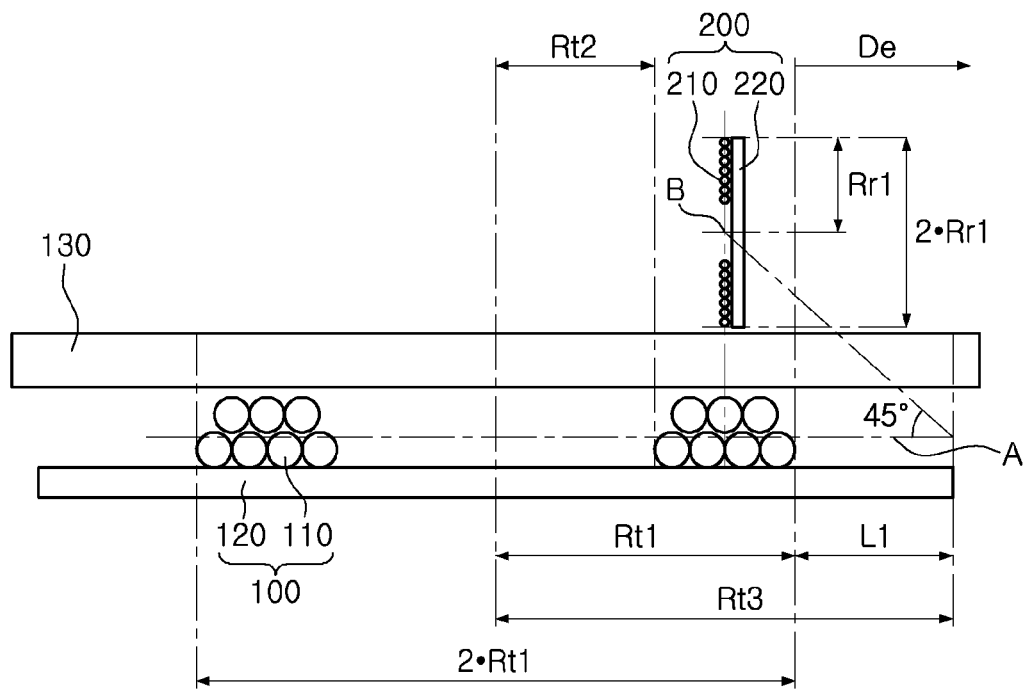
Figure 8:
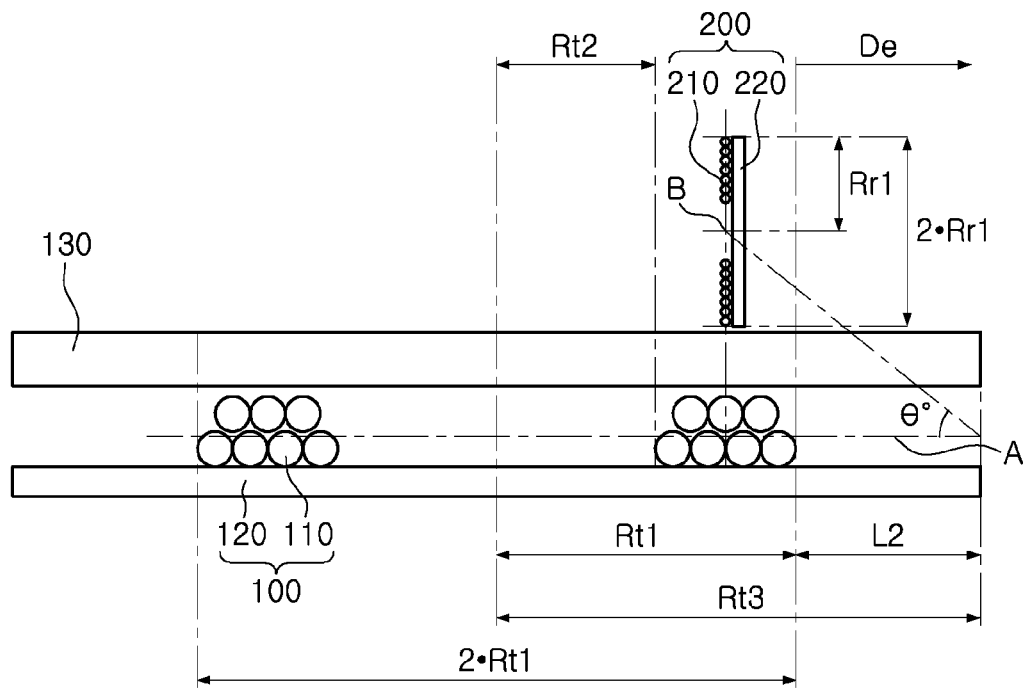

FIGS. 7 and 8 are cross-sectional views of the wireless power transmitter according to an exemplary embodiment in the present disclosure. As illustrated in FIGS. 7 and 8, respectively, a length of the transmitting core 120 of the wireless power transmitter 100 according to an exemplary embodiment in the present disclosure may be larger than the diameter of the transmitting coil 110. That is, the transmitting core 120 of the wireless power transmitter 100 may be extended beyond the transmitting coil 110.

According to an exemplary embodiment, extended distances L1 and L2 of the transmitting core 120 may be determined using the length of the receiving coil 210. For example, in a case in which the receiving coil 210 is vertically positioned on the wireless power transmitter 100, the extended distance of the transmitting core 120 may be determined so as to be proportional to a length of a radius of the receiving coil 210.

According to an exemplary embodiment, the transmitting core 120 may have a shortest distance from a magnetic average point of the transmitting coil 110 to the receiving coil 210 as a minimum extended distance of the transmitting core 120.

In an illustrated example, since the transmitting coil 110 includes the two layers, it may be appreciated that the magnetic average point of the transmitting coil 110 is the center point between the two layers. More accurately, since three windings are provided on an upper layer of the transmitting coil 110 and four windings are provided on a lower layer of the transmitting coil 110, the magnetic average point may slightly lean to the lower layer from the center point between the two layers. In a case in which the transmitting coil 110 includes n layers having the winding turns which are vertically symmetrical with each other, the magnetic average point of the transmitting coil 110 may become n/2.

As shown in FIG. 7, the extended length L1 of the transmitting core 120 may be determined to correspond to a length at which a virtual line A extended from the magnetic average point of the transmitting coil 110 in a direction parallel to the transmitting core 120 and a virtual line connecting an arbitrary point of the virtual line A and a center point B of the receiving coil 210 form an angle of 45°. In this case, the receiving coil 210 may be positioned vertically above the transmitting coil 110. In other words, an end of the transmitting core 120 may be positioned to correspond to an intersection point between the virtual line A extended from the magnetic average point of the transmitting coil 110 in the direction parallel to the transmitting core 120 and a virtual line forming an angle of 45° with the virtual line A while passing through the center point B of the receiving coil wirelessly receiving power.

The extended length L1 of the transmitting core 120 may be determined to correspond to the length at which the virtual line A extended from the magnetic average point and the virtual line extended from the center point B of the receiving coil 210 form the angle of 45°.

Since the extended length L1 of the transmitting core 120 is determined to correspond to the angle formed by the virtual line extended from the center point B of the receiving coil 210 and the virtual line A extended from the magnetic average point, when the angle is increased, the extended length L1 may be decreased, and when the angle is decreased, the extended length L1 may be increased.

As illustrated in FIG. 8, the extended line L2 of the transmitting core 120 may be longer than the extended length L1 illustrated in FIG. 7. In a case of an exemplary embodiment illustrated in FIG. 8, the angle θ may be 45° or less.

Experimental data representing an effect according to the extended length of the transmitting core 120 may be represented by the following Table 1.

TABLE 1

| Angle θ | S21 | Passive Low Power Resonator Efficiency |
|---|---|---|
| 59 | −10.9 dB | 0.081283 |
| 53.4 | −10.4 dB | 0.091201 |
| 48.5 | −10.2 dB | 0.095499 |
| 44.2 | −9.8 dB | 0.104713 |

The data in Table 1 is obtained by using a transmitting coil which is wound to form a single layer, wherein a thickness of a wire is 1.2 mm.

In a case in which the angle θ is 59°, the transmitting coil 110 and the transmitting core 120 have the same size as each other as illustrated in FIG. 6. That is, the extended length of the transmitting core is 0.

It may be appreciated from Table 1 that as the angle θ is reduced, the length of the transmitting core 120 is increased and resonance performance is improved, accordingly. In addition, S21 is a value derived from a relationship between an input power and an output power of an antenna. As the value of S21 closes to 0 dB, this means high performance. It may also be appreciated from data of S21 that as the extended length of the transmitting core 120 is increased, the high performance may be obtained.

Figure 9:
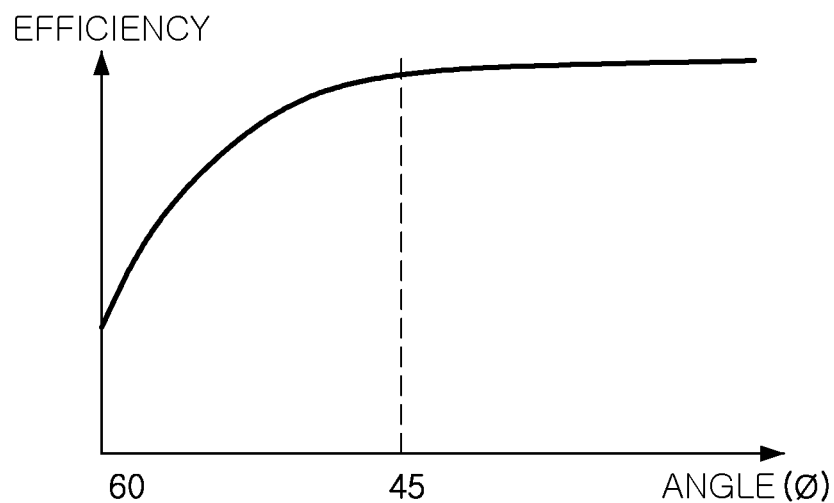
FIG. 9 is a graph illustrating efficiency depending on an angle formed by a virtual line extended from a magnetic average point and a virtual line extended from a center point of a receiving coil.

A graph of FIG. 9 including the data of Table 1 described above may be obtained. FIG. 9 is a graph illustrating efficiency depending on the angle formed by the virtual line extended from the magnetic average point and the virtual line extended from the center point of the receiving coil 210, corresponding to the data described above.

As seen from the data, it may be seen that the efficiency is high at an angle of 45°. That is, it may be seen that as the extended length of the transmitting core 120 is increased, the effect is also proportionally increased up to the angle of 45°, but the effect is similar in a case in which the transmitting core 120 is extended so that the angle is decreased to about 45° or less.

That is, in a case in which the length of the transmitting core 120 is excessively long, there is a problem that the size of the wireless power transmitter 100 is inevitably increased. Therefore, the length of the transmitting core 120 may be more advantageous in a case in which it satisfies a condition as short as possible within the limits having a sufficient effect. Thus, it may be appreciated that the length of the transmitting core 120 may have a critical meaning as a minimum extended length when the angle is 45°.

According to an exemplary embodiment, the wireless power transmitter 100 may further include a case 130.

According to an exemplary embodiment, the case 130 may include a predetermined structure or visual means capable of marking a position of the wireless power receiver 200. That is, the case 130 may include a predetermined groove, mark, sign, or the like at a corresponding position so that the wireless power receiver 200 is held at the corresponding position of the transmitting coil 110. For example, in a case in which the wireless power receiver 200 is a wearable equipment of a watch shape, the case 130 may include a predetermined intaglio shape which corresponds to a portion of a shape of the corresponding wearable equipment or at which the wearable equipment may be held.

Figure 10:
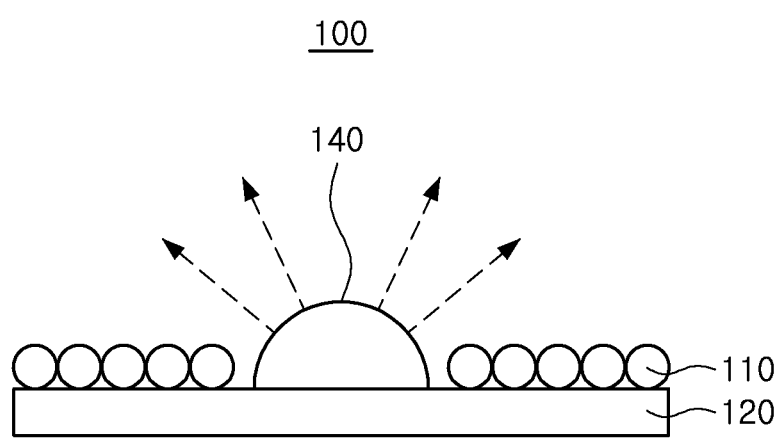
FIGS. 10 through 12 are diagrams illustrating the configuration of a wireless power transmitter according to an exemplary embodiment in the present disclosure.
Figure 11:
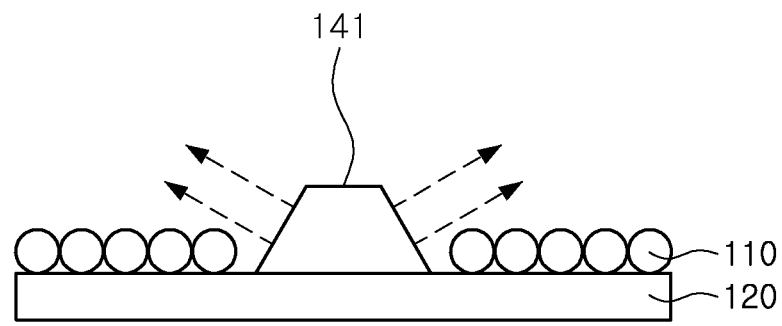
Figure 12:
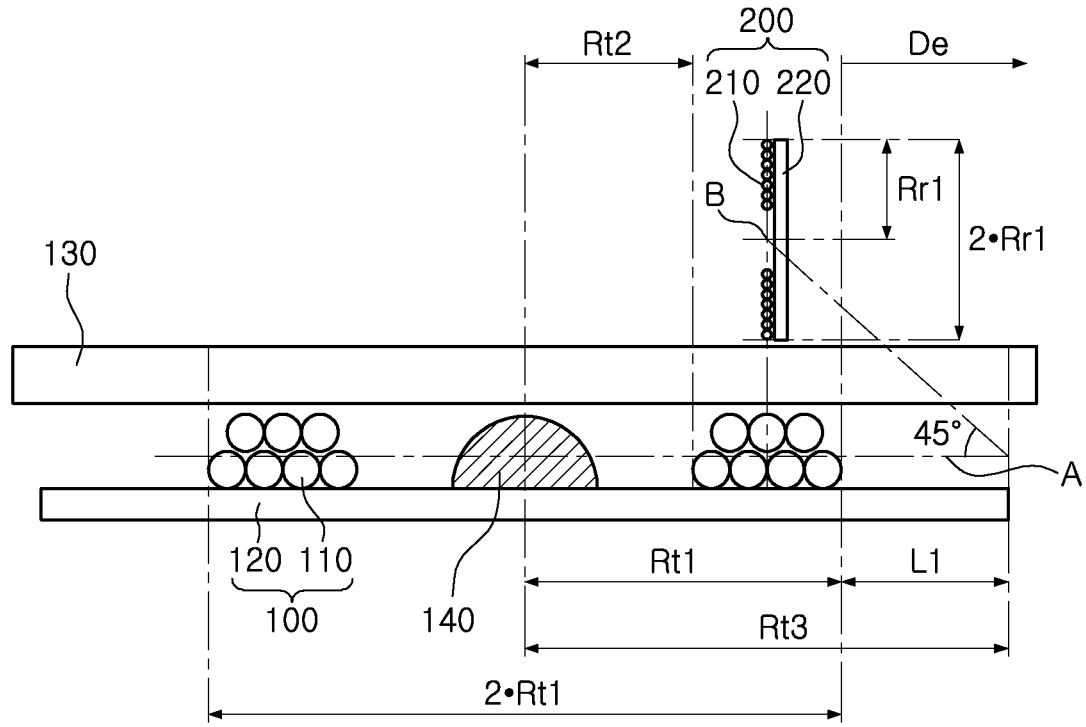

As illustrated in FIGS. 10 through 12, the wireless power transmitter 100 according to an exemplary embodiment in the present disclosure may further include a magnetic body 140.

The magnetic body 140 may be positioned inside the transmitting coil 110, so as to amplify flux or adjust directivity of the magnetic field transmitted from the transmitting coil 110.

FIG. 10 is a diagram illustrating the configuration of a wireless power transmitter 100 according to an exemplary embodiment in the present disclosure, wherein the wireless power transmitter 100 according to an exemplary embodiment in the present disclosure may include the transmitting coil 110, the transmitting core 120, and the magnetic body 140. In FIG. 11, dotted arrows may denote the flux of the magnetic field.

The transmitting coil 110 may wirelessly transmit power. As described above, the transmitting coil 110 may transmit the power in the electromagnetic resonance mode. The transmitting coil 110 may have a value of about 10 μH or less at a frequency of 6.78 MHz. In addition, the transmitting coil 110 may be implemented in a spiral shape or a helical shape.

In the case in which the transmitting coil 110 is implemented in the spiral shape, the size of the internal diameter of the transmitting coil 110 may be larger than 20 mm, as described above. In addition, the size of the external diameter of the transmitting coil 110 may be larger than 45 mm.

The transmitting core 120 may include a printed circuit board (PCB), a shielding sheet having an electromagnetic shielding function, a magnetic core, or the like. In a case in which the transmitting core 120 includes the PCB, the transmitting coil 110 may be provided on the PCB in a PCB pattern. In addition, in order for the transmitting coil 110 to include a plurality of layers, the PCB, which is the transmitting core 120, may also include the plurality of layers.

The magnetic body 140 may be disposed inwardly from the internal diameter of the transmitting coil 110. As shown in FIG. 10, the magnetic body 140 may have an end surface of a curved shape. That is, the wireless power transmitter according to an exemplary embodiment in the present disclosure shown in FIG. 10 may allow a path of the magnetic field to be formed in a direction of a virtual line which is normal to a surface of the magnetic body 140 of the coil by disposing the magnetic body 140 having the end surface of the curved shape inwardly from the internal diameter of the transmitting coil 100. Therefore, the wireless power transmitter according to an exemplary embodiment in the present disclosure may allow the receiving coil 210 (see FIGS. 6 through 8) positioned in a direction perpendicular to a substrate 120 as illustrated in FIG. 6 as well as the receiving coil positioned in a direction parallel to the substrate 120 on which the transmitting coil 110 is disposed to wirelessly receive power.

FIG. 11 is a diagram illustrating the configuration of the wireless power transmitter according to an exemplary embodiment in the present disclosure, wherein the wireless power transmitter according to an exemplary embodiment in the present disclosure may include the transmitting coil 110, the substrate 120, and the magnetic body 141. In FIG. 11, dotted arrows may denote the flux of the magnetic field.

The wireless power transmitter according to an exemplary embodiment in the present disclosure illustrated in FIG. 11 is the same as the wireless power transmitter according to an exemplary embodiment in the present disclosure illustrated in FIG. 10, except that the end surface of the magnetic body 141 has a polygonal shape. Similar to that described in FIG. 10, the wireless power transmitter according to an exemplary embodiment in the present disclosure may change a direction of the magnetic field by disposing the magnetic body 141 inwardly from the internal diameter of the transmitting coil 110, and may allow the receiving coil positioned in the direction perpendicular to the transmitting core 120 as well as the receiving coil positioned in the direction parallel to the transmitting core 120 to smoothly receive power wirelessly.

Although the cases in which the magnetic bodies 140 and 141 have the end surface of the curved shape or the polygonal shape are illustrated in FIGS. 10 and 11, the magnetic body may be implemented in any shape as long as the virtual line which is normal to the surface of the magnetic body forms an acute angle with the transmitting core 120.

In addition, although not illustrated in FIGS. 10 and 11, the wireless power transmitter according to an exemplary embodiment in the present disclosure illustrated in FIGS. 10 and 11 may further include the case 130, similarly to those shown in FIGS. 6 through 8.

FIG. 12 illustrates a wireless power transmitter according to an exemplary embodiment in the present disclosure and illustrates a case in which the magnetic body is applied to the wireless power transmitter illustrated in FIGS. 6 through 8.

In the illustrated example, a semispherical magnetic body 140 is illustrated. Since the semispherical magnetic body 140 may induce the magnetic field to be transmitted in a direction which is perpendicular to a semispherical surface, that is, a virtual line direction which is normal to a surface of the magnetic body 140, the magnetic field transmitted from the transmitting coil 110 may further lean in a direction of the receiving coil 210. As described above, the magnetic body 140 may have various shapes such as a polygonal shape.

Figure 13:
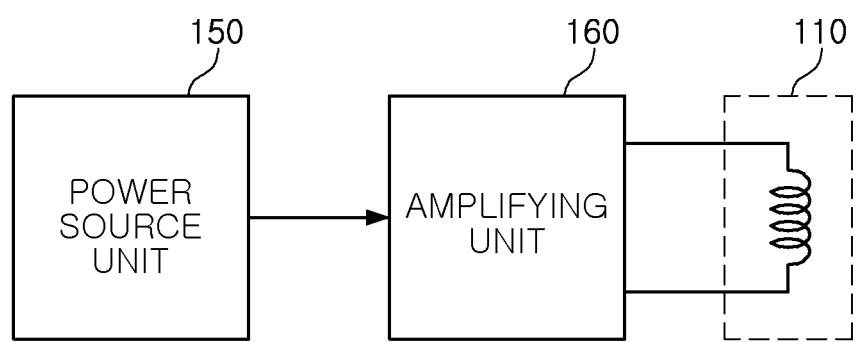
FIG. 13 is a diagram showing some elements of the wireless power transmitter according to an exemplary embodiment in the present disclosure.

FIG. 13 is a diagram showing of some elements of the wireless power transmitter according to an exemplary embodiment in the present disclosure, wherein the wireless power transmitter according to an exemplary embodiment in the present disclosure may include a power source unit 150, an amplifying unit 160, and the transmitting coil 110. Although FIG. 13 illustrates a case in which the transmitting coil 110 includes one coil, the transmitting coil 110 may include two coils, that is, a first coil to which radio frequency (RF) power having high frequency is applied from the amplifying unit 160 and a second coil disposed to be spaced apart from the first coil and transmitting the radio frequency power, which is induced from the first coil in an electromagnetic resonance mode.

The power source unit 150 may supply power to the amplifying unit 160. The power source unit 150 may include an analog-digital (AD) converter that converts alternating current power applied from an external power source into direct current power and a direct current (DC)-to-DC converter that varies magnitude of the direct current power.

The amplifying unit 160 may amplify the power supplied from the power source unit 150 and supply the amplified power to the transmitting coil 110. The amplifying unit 160 may include a power amplifier, an oscillator, and the like.

The transmitting coil 110 may wirelessly transmit power. In this case, the transmitting coil 110 may transmit power in an electromagnetic resonance mode.

As set forth above, according to exemplary embodiments in the present disclosure, the wireless power transmitter may efficiently transmit the power wirelessly to various portable devices. In addition, by using the wireless power transmitter according to an exemplary embodiment in the present disclosure, the receiving coil of the electronic device receiving the power wirelessly and/or the transmitting coil of the wireless power transmitter transmitting the power wirelessly may be more freely designed.

While exemplary embodiments have been shown and described above, it will be apparent to those skilled in the art that modifications and variations could be made without departing from the scope of the present invention as defined by the appended claims.

What is claimed is:
1. A wireless power transmitter comprising:
a transmitting core;
a transmitting coil provided on the transmitting core to transmit power wirelessly; and
a magnetic body provided on the transmitting core and having at least one region allowing a virtual line which is normal to a surface of the magnetic body to form an acute angle with the transmitting core,
wherein the magnetic body is disposed inwardly from an internal diameter of the transmitting coil.

2. The wireless power transmitter of claim 1, wherein the transmitting core is one of a printed circuit board, a shielding sheet having an electromagnetic field shielding function, and a magnetic core.

3. The wireless power transmitter of claim 1, wherein the transmitting coil has a spiral shape or a helical shape.

4. The wireless power transmitter of claim 1, wherein the transmitting coil includes a plurality of layers.

5. The wireless power transmitter of claim 1, wherein the transmitting coil has inductance of 10 μH or less at a frequency of 6.78 MHz.

6. The wireless power transmitter of claim 1, wherein the magnetic body is disposed in a central portion of the transmitting coil.

7. The wireless power transmitter of claim 1, wherein a cross section of the magnetic body has a semispherical shape or a polygonal shape.

8. The wireless power transmitter of claim 1, wherein the transmitting core is extended beyond the transmitting coil.

9. The wireless power transmitter of claim 8, wherein an end of the transmitting core is positioned to correspond to an intersection point between a virtual line extended from a magnetic average point of the transmitting coil in a direction parallel to the transmitting core and a virtual line forming an angle of 45° with the virtual line while passing through a center point of the receiving coil wirelessly receiving power.

10. The wireless power transmitter of claim 1, further comprising a case disposed on the transmitting coil and the magnetic body.

11. The wireless power transmitter of claim 1, further comprising:
    a power source unit receiving power from an external power source to output supply power; and
    an amplifying unit amplifying the supply power to supply the amplified power to the transmitting coil.

12. The wireless power transmitter of claim 11, wherein the transmitting coil includes:
    a first coil to which the amplified power is applied; and
    a second coil disposed to be spaced apart from the first coil and transmitting the amplified power induced from the first coil in an electromagnetic resonance mode.

13. A wireless power transmitter comprising:
    a transmitting coil transmitting power wirelessly; and
    a magnetic body disposed in a central portion of the transmitting coil and having at least one region allowing a virtual line which is normal to a surface of the magnetic body to form an acute angle with a surface which the transmitting coil is provided on,
    wherein the magnetic body is disposed inwardly from an internal diameter of the transmitting coil.

14. The wireless power transmitter of claim 13, wherein the transmitting coil has inductance of 10 μH or less at a frequency of 6.78 MHz.

15. The wireless power transmitter of claim 13, wherein a cross section of the magnetic body has a semispherical shape or a polygonal shape.

16. The wireless power transmitter of claim 13, further comprising:
    a power source unit receiving power from an external power source to output supply power; and
    an amplifying unit amplifying the supply power to supply the amplified power to the transmitting coil.

17. The wireless power transmitter of claim 16, wherein the transmitting coil includes:
    a first coil to which the amplified power is applied; and
    a second coil disposed to be spaced apart from the first coil and transmitting the amplified power induced from the first coil in an electromagnetic resonance mode.

* * * * *